Feb. 13, 1951     W. D. BAHR     2,541,146
FISH POLE HOLDER
Filed Sept. 29, 1949

Inventor
WILLIAM D. BAHR
By Gerald P. Welch
Attorney

Patented Feb. 13, 1951

2,541,146

UNITED STATES PATENT OFFICE 2,541,146

FISH POLE HOLDER

William D. Bahr, West Allis, Wis.

Application September 29, 1949, Serial No. 118,653

1 Claim. (Cl. 248—42)

This invention relates to improvement in fish pole holders, and more particularly to a novel fish pole holder adapted for attachment to the hull of a small boat.

An object of the invention is to provide an inexpensive device having a minimum of parts, and simplicity of operation for the purpose described.

Another object of the invention is to provide a fish pole holder which will support a fish pole in either of two directions transversely of the installation.

Another object of the invention is to provide a device of the type which will have simple and efficient means for supporting a fish pole in position for use.

Other and further objects of the invention will appear as the description proceeds, reference being had to the accompanying drawing, in which.

Figure 1:
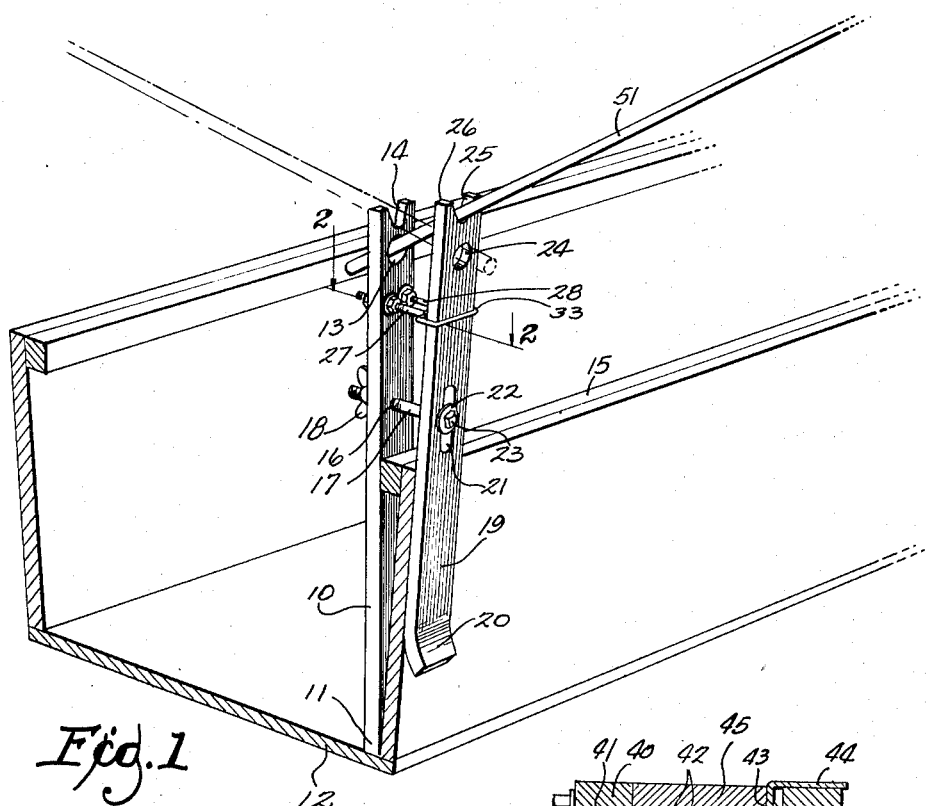
Figure 1 is a view in perspective of a fish pole holder embodying the invention.

Referring more particularly to the drawing, the numeral 10 designates a relatively long inner bar or standard adapted to rest with its lower end 11 on the bottom 12 of a fishing boat. The bar 10 has a circular aperture spaced from the top thereof at 13 and a notch 14 in its upper end adapted to freely receive a fish pole. The bar 10 is also apertured at 16 to accommodate the bolt 17 which is provided with a wing nut 18. The relatively shorter exterior bar 19 is flared outwardly at its lower end 20 to compensate for the natural flare encountered in the hull formation of many small boats. The exterior bar 19 has a vertical slot at 21 thereof adapted to accommodate the bolt 17 which latter is retained in position at the outer bar end by the washer 22 and bolt head 23. The bar 19 is apertured circularly at 24 thereof to permit the retension therein of the butt end of a fish pole, and has a notch at 25 in its upper end 26 to allow free rest of a fish pole therein. A horizontal spacer for the bars 10 and 19 is comprised of a pair of bolts 27 and 28 secured in horizontal and parallel alignment piercing the bar 19, by means of the nuts 29. The bolt heads 30 are drilled at 31 thereof to accommodate the ends 32 of the rectangular rod retainer 33.

Figure 3:
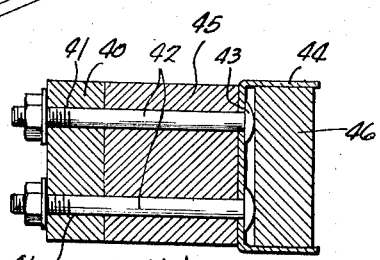
Figure 3 is a similar view of a modified form of the invention.
Figure 2:
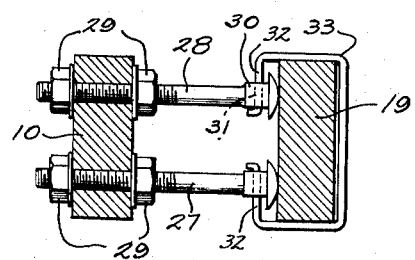
Figure 2 is a horizontal sectional view on line 2—2 of Figure 1.
Figure 4:
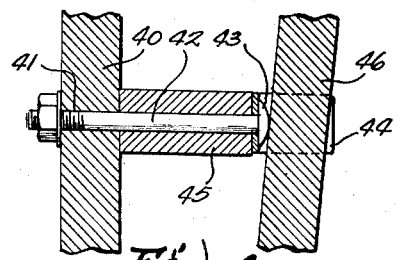
Figure 4 is a vertical sectional view of a fragmentary portion of the same form of the invention.

In the modified form of the invention shown in Figures 3 and 4, the inner bar 40 is apertured at 41 to accommodate a bolt 42 which retains with the head thereof 43 a C clamp 44 and a wood block spacer 45. The exterior bar 46 is held within the C clamp 44 similarly to the preferred form of the invention.

In use, the inner bar 10 is placed interiorly of the boat to rest on the hull bottom 12 and the short bar 19 is placed exteriorly of the gunwale 15. The slot at 21 permits adjustment vertically of the bar 19 to regulate the angle at which the fish pole 51 is held. When the bar 19 has been properly adjusted, the wing nut 18 is tightened to secure the assembly. The fish pole 51 may then be inserted into either one of apertures 13 or 24 and rested in either one of the slots 14 or 25 as desired.

In the modified form of the invention the C clamp 44 is substituted for the rod clamp guide 33.

It will be understood that the device is capable of many modifications in structure and design, without departing from the spirit of the invention, within the scope of the appended claim.

Having thus described the invention, what is claimed and desired to be secured by Letters Patent of the United States, is:

A fish pole holder comprising a vertical bar for placement inside of boat against the bottom and gunwale thereof, an outer bar having a vertical slot therein, an outwardly flared lower end on said outer bar to accommodate variations in hull design, a spacer for the upper ends of said bars, a bolt through said inner bar passing through the slot of said outer bar to permit vertical adjustment of the latter, means for tightening said bolt, both of said bars having a circular aperture adjacent the upper end and a notch at the top thereof whereby a fish pole butt end may be inserted in the aperture of one bar and rested freely in the notch of the other to support the said pole for fishing.

WILLIAM D. BAHR.

No references cited.